(12) United States Patent
Vutukuri et al.

(10) Patent No.: US 11,632,816 B2
(45) Date of Patent: *Apr. 18, 2023

(54) CONFIGURING SIDELINK COMMUNICATIONS

(71) Applicant: BlackBerry Limited, Waterloo (CA)

(72) Inventors: Eswar Vutukuri, Havant (GB); Rene Faurie, Versailles (FR); Stephen John Barrett, Haywards Heath (GB); Gordon Peter Young, Kineton (GB); Adrian Buckley, Tracy, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/519,076

(22) Filed: Nov. 4, 2021

(65) Prior Publication Data
US 2022/0061112 A1 Feb. 24, 2022

Related U.S. Application Data

(63) Continuation of application No. 16/832,750, filed on Mar. 27, 2020, now Pat. No. 11,191,117, which is a
(Continued)

(30) Foreign Application Priority Data

Jun. 15, 2017 (EP) .................................... 17305732

(51) Int. Cl.
*H04W 76/14* (2018.01)
*H04W 4/70* (2018.01)
(Continued)

(52) U.S. Cl.
CPC ............ *H04W 76/14* (2018.02); *H04W 4/70* (2018.02); *H04W 56/00* (2013.01); *H04W 72/23* (2023.01);
(Continued)

(58) Field of Classification Search
None
See application file for complete search history.

(56) References Cited

U.S. PATENT DOCUMENTS

| 10,616,940 B2 | 4/2020 | Young et al. |
| 2014/0199969 A1 | 7/2014 | Johnsson et al. |

(Continued)

FOREIGN PATENT DOCUMENTS

| CN | 105812109 | 7/2016 |
| CN | 106535332 | 3/2017 |

(Continued)

OTHER PUBLICATIONS

KR Office Action issued in Korean Application No. 10-2020-7001355, dated Jun. 22, 2022, 11 pages (with English Translation).
(Continued)

*Primary Examiner* — Mohammed Rachedine
(74) *Attorney, Agent, or Firm* — Fish & Richardson P.C.

(57) ABSTRACT

Systems and methods to configure sidelink resources in a dual connectivity operation are provided. In some aspect, a method comprising: transmitting, from a user equipment (UE), a first message to a first evolved Node B (eNB), wherein the first message indicates a request to establish a sidelink communication; receiving, at the UE, a second message from the first eNB, wherein the second message indicates a frequency that is used by a secondary evolved Node B (SeNB); transmitting, from the UE, a measurement result to the first eNB; and receiving, at the UE, sidelink configuration information from the first eNB, wherein the sidelink configuration information indicates sidelink resources managed by the secondary eNB.

18 Claims, 13 Drawing Sheets

Related U.S. Application Data continuation of application No. 15/661,845, filed on Jul. 27, 2017, now Pat. No. 10,616,940.

(51) Int. Cl.
| | |
|---|---|
| *H04W 56/00* | (2009.01) |
| *H04W 76/15* | (2018.01) |
| *H04W 88/02* | (2009.01) |
| *H04W 4/40* | (2018.01) |
| *H04W 92/18* | (2009.01) |
| *H04W 72/23* | (2023.01) |
| *H04W 72/51* | (2023.01) |

(52) U.S. Cl.
CPC ............ *H04W 76/15* (2018.02); *H04W 72/51* (2023.01); *H04W 88/02* (2013.01)

(56) References Cited

U.S. PATENT DOCUMENTS

| | | | | |
|---|---|---|---|---|
| 2016/0044552 | A1* | 2/2016 | Heo ...................... | H04W 48/20 370/331 |
| 2016/0174181 | A1 | 6/2016 | Fujishiro et al. | |
| 2016/0270139 | A1* | 9/2016 | Rahman ................ | H04W 72/20 |
| 2017/0041773 | A1 | 2/2017 | Fujishiro et al. | |
| 2017/0070876 | A1 | 3/2017 | Fujishiro et al. | |
| 2017/0245245 | A1* | 8/2017 | Kim ...................... | H04W 72/21 |
| 2017/0331577 | A1* | 11/2017 | Parkvall ................. | H04W 4/00 |
| 2018/0092067 | A1* | 3/2018 | Liu ........................ | H04W 72/51 |
| 2018/0092118 | A1* | 3/2018 | Kim ...................... | H04W 72/20 |
| 2018/0359707 | A1* | 12/2018 | Chae .................... | H04W 52/383 |
| 2018/0368191 | A1 | 12/2018 | Young et al. | |
| 2020/0092907 | A1* | 3/2020 | Yi .......................... | H04W 4/40 |
| 2020/0229251 | A1 | 7/2020 | Vutukuri et al. | |

FOREIGN PATENT DOCUMENTS

| | | | | |
|---|---|---|---|---|
| EP | 3242525 | | 11/2017 | |
| EP | 3334195 | | 6/2018 | |
| EP | 3334195 | A1 * | 6/2018 | ............ H04W 24/10 |
| EP | 3372001 | | 9/2018 | |
| EP | 3372001 | A1 * | 9/2018 | ............ H04W 24/10 |
| EP | 3640673 | | 4/2020 | |
| EP | 3640673 | A1 * | 4/2020 | ............. G01S 11/02 |
| WO | 2015170729 | | 11/2015 | |
| WO | 2016072502 | | 5/2016 | |
| WO | 2016107613 | | 7/2016 | |
| WO | 2017057952 | | 4/2017 | |
| WO | WO-2017057952 | A1 * | 4/2017 | ........... H04L 5/0044 |

OTHER PUBLICATIONS

JP Office Action issued in Japanese Application No. 2019-569306 dated Feb. 21, 2022, 5 pages (With English Translation).
Communication Pursuant to Article 94(3) EPC issued in European Application No. 17305732.4 dated Jul. 18, 2019, 6 pages.
Communication Pursuant to Article 94(3) EPC issued in European Application No. 17305732.4 dated Jan. 30, 2020, 6 pages.
Communication Under Rule 71 (3) EPC issued in European Application No. 17305732.4 dated Aug. 27, 2020, 6 pages.
Extended European Search Report issued in European Application No. 17305732.4 dated Dec. 15, 2017, 8 pages.
Extended European Search Report issued in European Application No. 21156453.9 dated May 18, 2021, 12 pages.
Non-Final Office Action issued in U.S. Appl. No. 15/661,845 dated Jul. 10, 2018, 22 pages.
Final Office Action issued in U.S. Appl. No. 15/661,845 dated Jan. 31, 2019, 27 pages.
Advisory Action issued in U.S. Appl. No. 15/661,845 dated Apr. 11, 2019, 2 pages.
Non-Final Office Action issued in U.S. Appl. No. 15/661,845 dated Jun. 13, 2019, 29 pages.
PCT International Search Report and Written Opinion in International Application No. PCT/US2018/36992, dated Aug. 24, 2018, 18 pages.
PCT International Preliminary Report on Patentability in International Application No. PCT/US2018/036992, dated Aug. 24, 2018, 8 pages.
3rd Generation Partnership Project, "Technical Specification Group Services and System Aspects; Service requirements for V2X services; Stage 1," 3GPP TS 22.185 (version 14.2.1), Nov. 2016, 14 pages.
3rd Generation Partnership Project, "Study on LTE support for Vehicle to Everything (V2X) services", 3GPP TR 22.885ve00 (version 14.0.0), Dec. 2015, 50 pages.
3rd Generation Partnership Project, "Technical Specification Group Services and System Aspects, Architecture enhancements for V2X Services," 3GPP TS 23.285vf00 (version 15.0.0), Mar. 2018, 36 pages.
3rd Generation Partnership Project, "Technical Specification Group Services and System Aspects; Proximity-based services (ProSe); Stage 2," 3GPP TS 23.303vf00 (version 15.0.0), Jun. 2017, 130 pages.
3rd Generation Partnership Project, "Technical Specification Group Core Network and Terminals; User Equipment (UE) to V2X control function; protocol aspects; stage 3," 3GPP TS 24.386ve30 (version 14.3.0), Dec. 2017, 35 pages.
3rd Generation Partnership Project, "Technical Specification Group Services and System Aspects; Telecommunication management; Charging management; Proximity-based Services (ProSe) charging," 3GPP TS 32.277vf00 (version 15.0.0), Jan. 2018, 117 pages.
3rd Generation Partnership Project, "Technical Specification Group Radio Access Network; Evolved Universal Terrestrial Radio Access (E-UTRA); Multiplexing and channel coding," 3GPP TS 36.212vf01 (version 15.0.1), Jan. 2018, 214 pages.
3rd Generation Partnership, "LTE; Evolved Universal Terrestrial Radio Access (E-UTRA); Physical layer procedures," ETSI TS 136 213 (version 12.4.0), Feb. 2015, 227 pages.
3rd Generation Partnership, "LTS; Evolved Universal Terrestrial Radio Access (E-UTRA) and Evolved Universal Terrestrial Radio Access Network (E-UTRAN); Overall description; Stage 2," ETSI TS 136.300 (version 14.3.0), 3GPP TS 36,300, (version 14,3,0, release 14), Jul. 2017, 347 pages.
3rd Generation Partnership Project, "Technical Specification Group Radio Access Network; Evolved Universal Terrestrial Radio Access (E-UTRA); User Equipment (UE) procedures in idle mode," 3GPP TS 36.304ve50 (version 14.5.0), Dec. 2017, 49 pages.
3rd Generation Partnership Project, "Technical Specification Group Radio Access Network; Evolved Universal Terrestrial Radio Access (E-UTRA); Medium Access Control (MAC) protocol specification," 3GPP TS 36.321vf00 (version 15.0.0), Dec. 2017, 109 pages.
3rd Generational Partnership Project, "Technical Specification Group Radio Access Network, Evolved Universal Terrestrial Radio Access (E-UTRA); Radio Resource Control (RRC); Protocol Specification," 3GPP TS 36.331vf01 (version 15.0.1), Jan. 2018, 776 pages.
3rd Generational Partnership Project, "Technical Specification Group Radio Access Network, Evolved Universal Terrestrial Radio Access (E-UTRA); Radio Resource Control (RRC); Protocol Specification," Draft, 3GPP TS 36.331-E22, Release 14, Apr. 2017, 721 pages.
3rd Generation Partnership Project, "Technical Specification Group Radio Access Network; Evolved Universal Terrestrial Radio Access Network (E-UTRAN); X2 application protocol (X2AP)," 3GPP TS 36.423vf00 (version 15.0.0), Dec. 2017, 350 pages.
3rd Generation Partnership Project, "Technical Specification Group Radio Access Network; Study on Small Cell enhancements for E-UTRA and E-UTRAN; Higher layer aspects," 3GPP TR 36.842 (version 12.0.0), Dec. 2013, 71 pages.
3rd Generation Partnership Project, "Technical Specification Group Radio Access Network; Study on LTE-based V2X Services," 3GPP TR 36.885 (version 14.0.0), Jun. 2016, 216 page.
3rd Generation Partnership Project, "Technical Specification Group Radio Access Network; Scenarios and requirements for small cell enhancements for E-UTRA and E-UTRAN," 3GPP TR 36.932 (version 13.0.0), Dec. 2015, 14 pages.

(56) References Cited

OTHER PUBLICATIONS

European Telecommunications Standards Institute, "Intelligent Transport Systems (ITS); Vehicular Communications; Basic Set of Applications; Definitions," ETSI TR 102 638, V1.1.1, Jun. 2009, 81 pages.
Office Action in Chinese Appln. No. 201880048712.7, dated Dec. 20, 2022, 18 pages (with English translation).

* cited by examiner

```
-- ASN1START

SCG-Config-r12 ::=       SEQUENCE {
    criticalExtensions       CHOICE {
        c1                       CHOICE{
            scg-Config-r12           SCG-Config-r12-IEs,
            spare7 NULL,
            spare6 NULL, spare5 NULL, spare4 NULL,
            spare3 NULL, spare2 NULL, spare1 NULL
        },
        criticalExtensionsFuture SEQUENCE {}
    }
}

SCG-Config-r12-IEs ::=   SEQUENCE {
    scg-RadioConfig-r12      SCG-ConfigPartSCG-r12      OPTIONAL,
    nonCriticalExtension     SEQUENCE {}                OPTIONAL
}

-- ASN1STOP
```

FIG. 3

```
SCG-ConfigPartSCG-r12 ::=      SEQUENCE {
    radioResourceConfigDedicatedSCG-r12   RadioResourceConfigDedicatedSCG-r12   OPTIONAL,   -- Need ON
    sCellToReleaseListSCG-r12             SCellToReleaseList-r10                 OPTIONAL,   -- Need ON
    pSCellToAddMod-r12                    PSCellToAddMod-r12                     OPTIONAL,   -- Need ON
    sCellToAddModListSCG-r12              SCellToAddModList-r10                  OPTIONAL,   -- Need ON
    mobilityControlInfoSCG-r12            MobilityControlInfoSCG-r12             OPTIONAL,   -- Need ON
    slConfigSCG-r15                       SIConfigSCG-r15                                    -- Need ON
    ...
    [[
    sCellToReleaseListSCG-Ext-r13         SCellToReleaseListExt-r13              OPTIONAL,   -- Need ON
    sCellToAddModListSCG-Ext-r13          SCellToAddModListExt-r13               OPTIONAL    -- Need ON
    ]]
}

SIConfigSCG-r15  ::=   SEQUENCE {
    SL-CommConfig               SL-commConfig              OPTIONAL   -- Need ON
    SL-CommResourcePool         SL-CommResourcePool        OPTIONAL   -- Need ON
    SL-CP-Len                   SL-CP-Len                  OPTIONAL   -- Need ON
    SL-DiscConfig               SL-DiscConfig              OPTIONAL   -- Need ON
    SL-DiscResourcePool         SL-DiscResourcePool        OPTIONAL   -- Need ON
    SL-DiscTxPowerInfo          SL-DiscTxPowerInfo         OPTIONAL   -- Need ON
    SL-GapConfig                SL-GapConfig               OPTIONAL   -- Need ON
    SL-GapRequest               SL-GapRequest              OPTIONAL   -- Need ON
    SL-HoppingConfig            SL-HoppingConfig           OPTIONAL   -- Need ON
    SL-SyncConfig               SL-SyncConfig              OPTIONAL   -- Need ON
    SL-SSID                     SL-SSID                    OPTIONAL   -- Need ON
    V2X-SyncConfig              SL-SyncConfigListV2X-r14   OPTIONAL   -- Need ON
    SL-V2X-ConfigDedicated      SL-V2X-ConfigDedicated-r14 OPTIONAL   -- Need ON
    ...
}
```

FIG. 4

```
SCG-ConfigPartSCG-r12 ::=          SEQUENCE {
    radioResourceConfigDedicatedSCG-r12    RadioResourceConfigDedicatedSCG-r12    OPTIONAL,    -- Need ON
    sCellToReleaseListSCG-r12              SCellToReleaseList-r10                 OPTIONAL,    -- Need ON
    pSCellToAddMod-r12                     PSCellToAddMod-r12                     OPTIONAL,    -- Need ON
    sCellToAddModListSCG-r12               SCellToAddModList-r10                  OPTIONAL,    -- Need ON
    mobilityControlInfoSCG-r12             MobilityControlInfoSCG-r12             OPTIONAL,    -- Need ON
    slConfigSCG-r15                        SlConfigSCG-r15                        OPTIONAL,    -- Need ON
    ...,
    [[
    sCellToReleaseListSCG-Ext-r13          SCellToReleaseListExt-r13              OPTIONAL,
    sCellToAddModListSCG-Ext-r13           SCellToAddModListExt-r13               OPTIONAL
    ]]
}

SlConfigSCG-r15 ::=    SEQUENCE {
    SL-DiscConfig              SL-DiscConfig-r12                OPTIONAL    -- Need ON
    SL-CommConfig              SL-CommConfig-r12                OPTIONAL    -- Need ON
    SL-SyncTxControl           SL-SyncTxControl-r12             OPTIONAL    -- Need ON
    V2X-SyncConfig             SL-SyncConfigListV2X-r14         OPTIONAL    -- Need ON
    SL-V2X-ConfigDedicated     SL-V2X-ConfigDedicated-r14       OPTIONAL    -- Need ON
    ...
}
```

```
-- ASN1START

SL-V2X-ConfigDedicated-r14 ::=     SEQUENCE {
    commTxResources-r14                CHOICE {
        release                            NULL,
        setup                              CHOICE {
            scheduled-r14                      SEQUENCE {
                sl-D-RNTI-r14                      C-RNTI,
                mac-MainConfig-r14                 MAC-MainConfigSL-r12,
                v2x-SchedulingPool-r14             SL-CommResourcePoolV2X-r14   OPTIONAL,  -- Need OP
                mcs-r14                            INTEGER (0..31)              OPTIONAL,  -- Need OP
                logicalChGroupInfoList-r14         LogicalChGroupInfoList-r13   OPTIONAL,  -- Need OP
            },
            ue-Selected-r14                    SEQUENCE {
                -- Pool for normal usage
                v2x-CommTxPoolNormalDedicated-r14  SEQUENCE {
                    poolToReleaseList-r14  SL-TxPoolToReleaseListV2X-r14  OPTIONAL,  -- Need ON
                    poolToAddModList-r14   SL-TxPoolToAddModListV2X-r14   OPTIONAL,  -- Need ON
                    v2x-CommTxPoolSensingConfig-r14  SL-CommTxPoolSensingConfig-r14
                                                                          OPTIONAL   -- Need ON
                }
            }
        }
    },
    v2x-InterFreqInfoList-r14      SL-InterFreqInfoListV2X-r14     OPTIONAL,  -- Need ON
    ...                                                            OPTIONAL,  -- Need ON
```

TO FIG. 6B

FROM FIG. 6A

```
SL-TxPoolToAddModListV2X-r14 ::=   SEQUENCE {
    poolIdentity-r14                    SL-V2X-TxPoolIdentity-r14,
    pool-r14                            SL-CommResourcePoolV2X-r14
}

SL-TxPoolToReleaseListV2X-r14 ::= SEQUENCE (SIZE (1..maxSL-V2X-TxPool-r14)) OF SL-V2X-TxPoolIdentity-r14

-- ASN1STOP

SL-CommResourcePoolV2X-r14 ::= SEQUENCE {
    sl-OffsetIndicator-r14          SL-OffsetIndicator-r12                                              OPTIONAL,   -- Need OR
    sl-Subframe-r14                 SubframeBitmapSL-r14,
    adjacencyPSCCH-PSSCH-r14        BOOLEAN,
    sizeSubchannel-r14              ENUMERATED {
                                        n4, n5, n6, n8, n9, n10, n12, n15, n16, n18, n20, n25, n30,
                                        n48, n50, n72, n75, n96, n100, spare13, spare12, spare11,
                                        spare10, spare9, spare8, spare7, spare6, spare5, spare4,
                                        spare3, spare2, spare1},
    numSubchannel-r14               ENUMERATED {n1, n3, n5, n10, n15, n20, spare2, spare1},
    startRB-Subchannel-r14          INTEGER (0..99),
    startRB-PSCCH-Pool-r14          INTEGER (0..99)                                                     OPTIONAL,   -- Need OR
    rxParametersNCell-r14           SEQUENCE {
        tdd-Config-r14                  TDD-Config                                                      OPTIONAL,   -- Need OP
        syncConfigIndex-r14             INTEGER (0..15)
    }                                                                                                   OPTIONAL,   -- Need OR
    dataTxParameters-r14            SL-TxParameters-r12                                                 OPTIONAL,   -- Cond Tx
    zoneID-r14                      INTEGER (0..7)                                                      OPTIONAL,   -- Need OR,
    ...
}
```

FIG. 6B

```
UE-EUTRA-Capability-v14xy-IEs ::= SEQUENCE {
    mac-Parameters-v14xy        MAC-Parameters-v14xy                    OPTIONAL,
    rlc-Parameters-v14xy        RLC-Parameters-v14xy,
    laa-Parameters-v14xy        LAA-Parameters-v14xy                    OPTIONAL,
    lwip-Parameters-v14xy       LWIP-Parameters-v14xy                   OPTIONAL,
    sl-parameters-v14xy         SL-Parameters-v14xy                     OPTIONAL,
    nonCriticalExtension        SEQUENCE {}                             OPTIONAL
}

SL-Parameters-r12 ::=   SEQUENCE {
    commSimultaneousTx-r12          ENUMERATED {supported}              OPTIONAL,
    commSupportedBands-r12          FreqBandIndicatorListEUTRA-r12      OPTIONAL
    discSupportedBands-r12          SupportedBandInfoList-r12           OPTIONAL,
    discScheduledResourceAlloc-r12  ENUMERATED {supported}              OPTIONAL,
    disc-UE-SelectedResourceAlloc-r12 ENUMERATED {supported}            OPTIONAL,
    disc-SLSS-r12                   ENUMERATED {supported}              OPTIONAL,
    discSupportedProc-r12           ENUMERATED {n50, n400}              OPTIONAL
}

SL-Parameters-v1310 ::= SEQUENCE {
    discSysInfoReporting-r13        ENUMERATED {supported}              OPTIONAL,
    commMultipleTx-r13              ENUMERATED {supported}              OPTIONAL,
    discInterFreqTx-r13             ENUMERATED {supported}              OPTIONAL,
    discPeriodicSLSS-r13            ENUMERATED {supported}              OPTIONAL
}

SL-Parameters-v14xy ::=  SEQUENCE {
    v2x-dcConfig-r14                ENUMERATED {supported}              OPTIONAL
}
```

FIG. 7

```
SCG-ConfigPartSCG-r12 ::=        SEQUENCE {
    radioResourceConfigDedicatedSCG-r12    RadioResourceConfigDedicatedSCG-r12    OPTIONAL,    -- Need ON
    sCellToReleaseListSCG-r12              SCellToReleaseList-r10                 OPTIONAL,    -- Need ON
    pSCellToAddMod-r12                     PSCellToAddMod-r12                     OPTIONAL,    -- Need ON
    sCellToAddModListSCG-r12               SCellToAddModList-r10                  OPTIONAL,    -- Need ON
    mobilityControlInfoSCG-r12             MobilityControlInfoSCG-r12             OPTIONAL,    -- Need ON
    sIConfigSCG-r15                        SIConfigSCG-r15                        OPTIONAL,    -- Need ON
    ...,
    [[
    sCellToReleaseListSCG-Ext-r13          SCellToReleaseListExt-r13              OPTIONAL,    -- Need ON
    sCellToAddModListSCG-Ext-r13           SCellToAddModListExt-r13               OPTIONAL     -- Need ON
    ]]
}

SIConfigSCG-r15    ::=
    sISchedulingNode      SEQUENCE {
                          STRING {MeNB, SeNB1, Spare, spare}                      -- Need ON
    sISyncSource          STRING {MeNB, SeNB1, GPS, spare}                        -- Need ON
...
}
```

SIConfigSCG field descriptions *sISchedulingNode*

Indicates the node that is responsible for sidelink scheduling. The UE shall direct the sidelink BSR to this node. *sISyncSource*
Indicates the node that acts as the sidelink synchronisation source.

FIG. 8

9.1.3.X  X2 TUNNEL DOWNLINK INFORMATION
*THIS MESSAGE IS SENT BY THE SeNB TO INFORM THE MeNB THAT THE ENCAPSULATED TUNNEL DOWNLINK MESSAGE SHOULD BE SENT TO THE UE.*
*DIRECTION: SeNB → MeNB.*

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| MESSAGE TYPE | M | | 9.2.13 | | YES | REJECT |
| MeNB UE X2AP ID | M | | eNB UE X2AP ID 9.2.24 | ALLOCATED AT THE MeNB | YES | REJECT |
| SeNB UE X2AP ID | M | | eNB UE X2AP ID 9.2.24 | ALLOCATED AT THE SeNB | YES | REJECT |
| TUNNELLED MESSAGE ID | M | | 9.2.X | | YES | IGNORE |
| TUNNELLED MESSAGE | O | | TBD | TBD | YES | REJECT |

9.2.X  TUNNELLED MESSAGE ID
*THIS IE UNIQUELY IDENTIFIES THE TUNNELLED MESSAGE FOR A UE.*

| IE/GROUP NAME | PRESENCE | RANGE | IE TYPE AND REFERENCE | SEMANTICS DESCRIPTION |
|---|---|---|---|---|
| TUNNELLED MESSAGE ID | M | | INTEGER (0..255,...) | SEE 3GPP TS 36.331 [3] SUBCLAUSE 6.2.1<br>254-DCI FORMAT 5A<br>255-RESERVE FOR FUTURE EXPANSION |

THE X2 TUNNEL DOWNLINK INFORMATION MESSAGE ENCAPSULATES THE INFORMATION THAT THE MeNB SHALL INCLUDE IN A PDCCH DCI 5/5A MESSAGE (SEE 3GPP TS 36.212) TO A UE.

FIG. 12

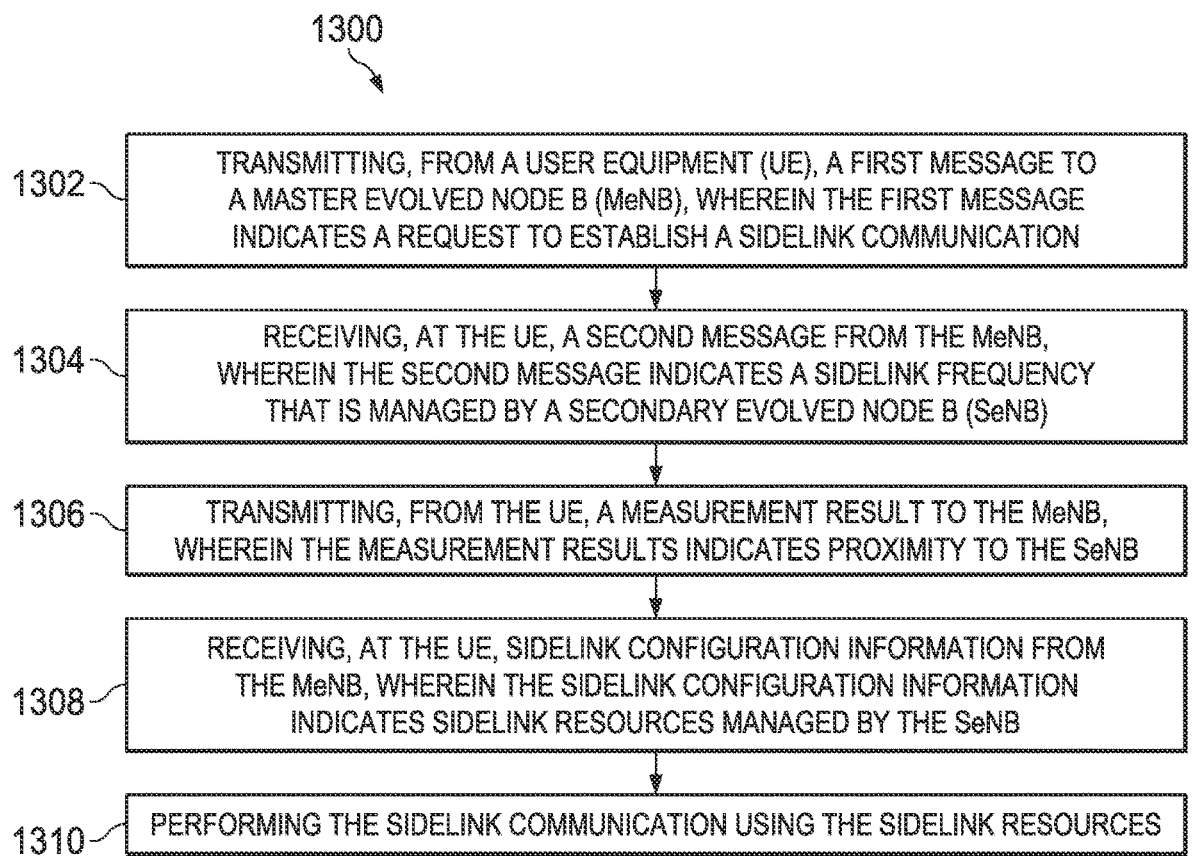
FIG. 13
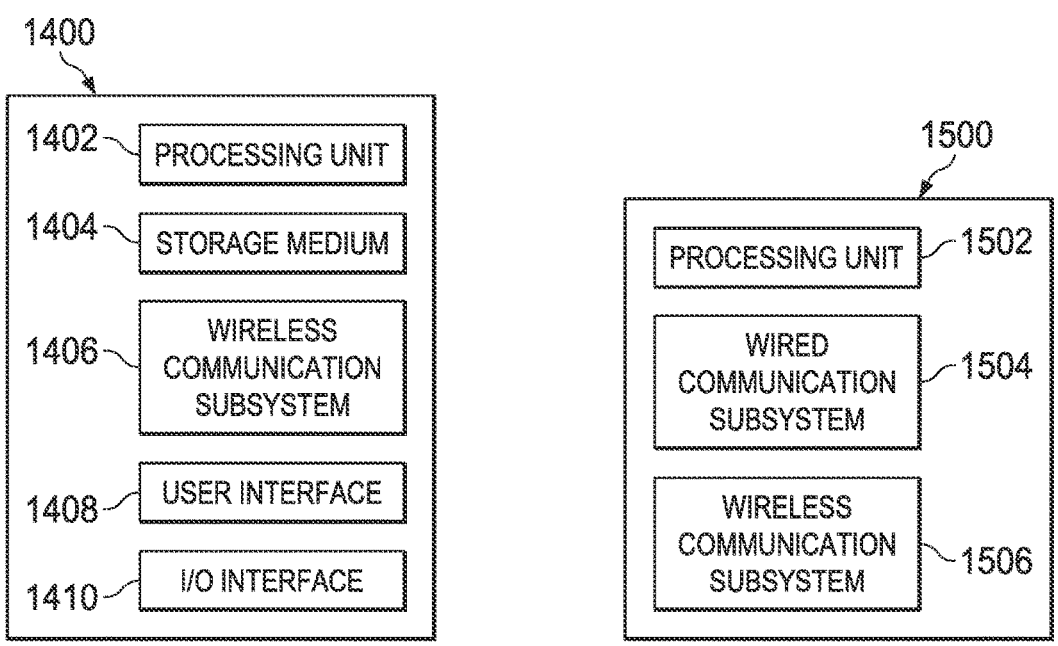
FIG. 14
FIG. 15

US 11,632,816 B2

CONFIGURING SIDELINK COMMUNICATIONS

CROSS-REFERENCE TO RELATED APPLICATIONS

This application is a continuation of and claims the benefit of priority to U.S. application Ser. No. 16/832,750, filed on Mar. 27, 2020, which claims the benefit of U.S. application Ser. No. 15/661,845, filed on Jul. 27, 2017, which claims foreign priority to E.P. Application Serial No. 17305732.4, filed on Jun. 15, 2017, the contents of which are hereby incorporated by reference.

TECHNICAL FIELD

This disclosure relates to data transmission in communication systems and, more specifically, to configuring sidelink communications.

BACKGROUND

In a telecommunication network, e.g., a Long Term Evolution (LTE) network or a next generation 5G network, Device to Device (D2D) Proximity-based Services (ProSe) may be supported. D2D ProSe may include a set of features supporting device to device communication in the Enhanced Packet System (EPS). These features may include ProSe Direct Communication and ProSe Direct Discovery.

ProSe Direct Communication refers to a radio communication operation whereby two ProSe-enabled user equipments (UE) can communicate with each other directly over a UE-to-UE (PC5) radio interface via sidelink channels. This communication mode may be supported for UEs within the coverage area of an Enhanced Universal Mobile Telecommunications System (UMTS) Terrestrial Radio Network (E-UTRAN) network or outside of the coverage area of an E-UTRAN network.

ProSe Direct Discovery refers to a set of procedures used by ProSe-enabled UEs to detect and identify other ProSe-enabled UEs in their proximity, using E-UTRA direct radio signals via PC5.

DESCRIPTION OF DRAWINGS

FIG. 3 illustrate an example SCG-Config message, according to an implementation.

FIG. 4 illustrates an example IE slConfigSCG-r15, according to an implementation.

FIG. 5 illustrates another example IE slConfigSCG-r15, according to an implementation.

FIGS. 6A-6B illustrate an example IE SL-V2X-ConfigDedicated, according to an implementation.

FIG. 7 illustrates an example IE UE-EUTRA-Capability-v14xy-IEs, according to an implementation.

FIG. 8 illustrates an example IE for explicit indication, according to an implementation.

FIG. 12 is an example block diagram illustrating a sidelink communication configuration method for a dual connectivity operation, according to an implementation.

FIG. 13 is an example flow diagram illustrating a process for transmitting the response vector in a message subsequent to the PRACH preamble, according to an implementation.

FIG. 14 is a block diagram illustrating an example user equipment (UE) device.

FIG. 15 is a block diagram illustrating an example base station device.

Like reference numbers and designations in the various drawings indicate like elements.

DETAILED DESCRIPTION

Figure 1:
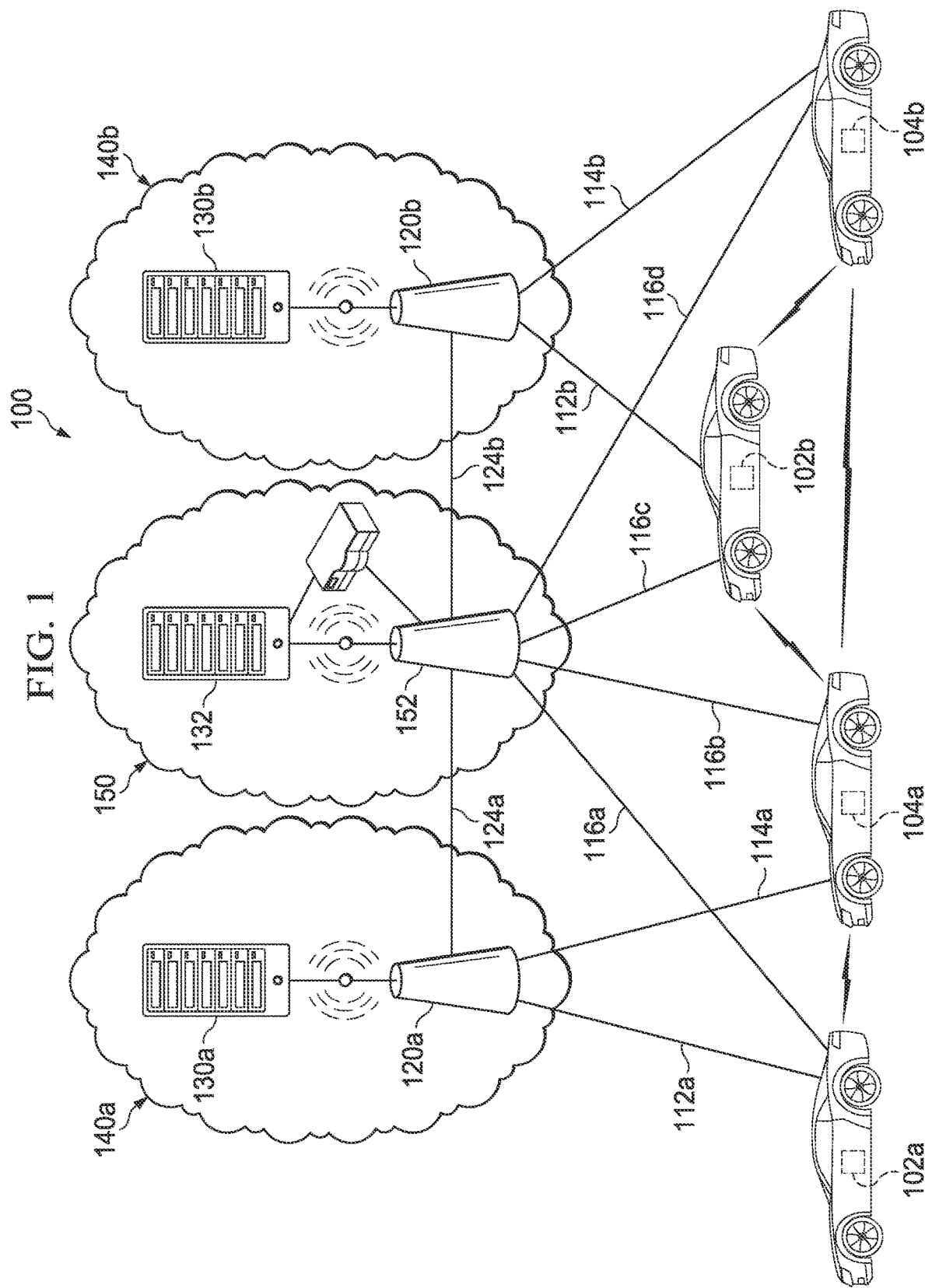
FIG. 1 is an example wireless communication system, according to an implementation.

The present disclosure is directed to configuring sidelink communications in a dual connectivity operation. In this disclosure, sidelink refers to the ProSe or device to device (D2D) radio transmission scheme—and by extension, to the related set of protocols—over the PC5 interface, to support the ProSe/D2D communication and discovery features. ProSe/D2D features are also applicable to ProSe/D2D relays that may be used to relay traffic either between two ProSe/D2D-enabled UEs or between a ProSe/D2D-enabled UE and the network, to extend existing network coverage. Uses of LTE ProSe/D2D include both Public Safety and commercial applications. In some cases, the LTE ProSe/D2D can also be used in vehicular communication environments including for example road safety and traffic information applications, providing V2X communications between mobile devices, fixed devices or mobile and fixed devices in close proximity. The terms LTE ProSe/D2D, ProSe/D2D and ProSe/D2D sidelink can be used interchangeably. Terms sidelink, V2X sidelink communications, V2V sidelink, V2X PC5 and PC5 may also be used to mean the same thing as delivery of Intelligent Transportation Service (ITS) or Services via the ProSe/D2D/PC5 channel within the current document and may be used interchangeably.

V2X refers to communication between any two Intelligent Transportation Service (ITS) capable devices where an ITS capable device could for example be a vehicle, pedestrian, animal, cyclist, road side unit (RSU) or any other devices capable of supporting ITS services. V2X for example may refer to communication between vehicle and any other Intelligent Transportation Service (ITS) capable device, including for example, Vehicle to Vehicle (V2V), Vehicle to Pedestrian (V2P), Vehicle to Infrastructure (V2I), or Vehicle to Network (V2N) communications. V2X enables transport entities, such as vehicles, roadside infrastructure, associated application servers, and pedestrians to obtain and share information regarding their local environment in order to process and share knowledge for more intelligent transport related services or applications, for example cooperative route planning, cooperative collision warning or autonomous driving. In some cases, the terms V2X and V2V may be used interchangeably, to refer to services provided to the UE for communication supporting vehicle orientated services. Examples of vehicle orientate services include Intelligent Transportation Systems (ITS) services such as road safety, (transport) traffic efficiency, and other application services. One will appreciate that the terminology in this disclosure is directed at communications between vehicles, intelligent transport service capable devices, roadside units, pedestrians, and etc. However, the technology is also applicable to other types of transportation systems, their infrastructure and passengers e.g. trains, track side signaling, passengers, aerial vehicles, drones etc., and vehicles that can communicate with trackside signaling e.g., cars at level crossings etc.

A UE may utilize resources of the ProSe/D2D sidelink when the UE is served and in coverage of the E-UTRAN and also when the UE is outside of E-UTRAN coverage. However, only UEs authorized to use V2X services in the respective coverage modes can perform V2X sidelink communication. If a UE is authorized for V2X sidelink communication in E-UTRAN coverage, it may then use one of two modes for sidelink resource selection, either scheduled resource allocation mode or UE autonomous resource selection mode as per the eNB configuration. Additionally, a set of sidelink transmission and reception resource pools for data transfer when the UE is out of E-UTRAN coverage for V2X sidelink communication may be pre-configured in the UE or configured in the UE from a server in the network.

When the UE is in coverage of the Mobile Network Operator (MNO) the use of scheduled mode of operation has the advantage of providing collision free transmission opportunities on the sidelink, and thus can improve the reliability of sidelink transmissions.

In some cases, a network may configure a UE to operate in a Dual Connectivity (DC) mode. In a DC operation, the configured set of serving cells for a UE includes two subsets: the Master Cell Group (MCG), including the serving cells of the Master eNB (MeNB) and the Secondary Cell Group, (SCG) including the serving cells of the Secondary eNB (SeNB). In the following, the use of terms Serving eNB, primary eNB and MeNB used in description prior to the establishment of a dual connectivity configuration is understood to refer to the single eNB which is in control of the primary RRC connection for the UE.

In a DC operation, a UE in the RRC_CONNECTED state uses radio resources provided by two distinct schedulers, located in the MeNB and SeNB, respectively. The MeNB and the SeNB are connected via a backhaul connection over the X2 interface. In DC, the radio protocol architecture that a particular data radio bearer uses depends on how the bearer is setup. Three Data Radio Bearer (DRB) types exist: MCG (Master Cell Group) bearer (controlled by MeNB), SCG (Secondary Cell Group) bearer (controlled by SeNB), and split bearer (split between MeNB and SeNB but anchored in the MeNB). The Radio Resource Control (RRC) for the DC UE is located in MeNB and the signal radio bearers (SRBs) are configured according to the DRB type.

When a UE is to be configured for DC operation the primary eNB may use the SeNB Addition Preparation procedure to request the target eNB to allocate resources for dual connectivity operation for the specific UE. As part of the signalling between the primary eNB to the target SeNB over the X2 interface within the X2 Application Protocol (X2:AP), the primary eNB can include a container, SCG-ConfigInfo message, in the SENB ADDITION REQUEST message to the SeNB. The SCG-ConfigInfo message can include information used to perform DC actions, e.g., to establish, modify or release an SCG, or to assist the target SeNB with assigning the SCG configuration. In response to a successful request procedure, the target SeNB can send the SENB ADDITION REQUEST ACKNOWLEDGEMENT message, which can include the container SCG-Config message, that includes any new or modified dedicated SCG configuration for the UE and, upon addition of an SCG cell, the common SCG configuration.

Direct V2V/V2X communications between peer entities (vehicles) requires, the vehicle UEs within a given geographical area to be able to communicate with each other regardless of whether these vehicle UEs are primarily associated with different mobile network operators (MNO).

In cellular communications, an MNO owns and controls a dedicated (e.g. licensed) spectrum and deploys services using this spectrum. Hence when a vehicle UE is associated with their respective MNO, any associated direct V2X communications by that vehicle UE may only occur over the dedicated spectrum of the respective MNO. Therefore, if vehicle UEs wishing to communicate directly with each other e.g. via sidelink, are associated with different MNOs, there may not be a common frequency for all the vehicle UEs to access and use to communicate directly with each other.

To address this issue, common frequency spectrum, including one frequency or a set of frequencies or frequency channels, may be assigned for delivery of V2X services e.g., V2V communications. Resources on this frequency, set of frequencies or frequency channels can then be utilized by all vehicle UEs to communicate directly with each other. This frequency spectrum assignment may be on a single area, multiple area or regional basis. However, with vehicle UEs associated to multiple MNOs using a single or dedicated set of frequencies or frequency channels for V2X communication, it is not clear how a UE receives its configuration of radio resources to utilize for sidelink operation, in particular for scheduled mode of ProSe/D2D communication. Devices operating in scheduled mode require resource allocation from the serving MNO, however in this instance all MNOs in the same area will be allocating resources for the common frequency or frequency channels to all vehicle devices. With different MNOs signaling resources for the same common frequency, any one MNO assigning a vehicle UE sidelink resources needs to establish clear and unambiguous sidelink resource allocation to the vehicle UE requesting resources, such that other MNO's vehicle UE V2X communication resource assignments occurring at or around the same time are not interfered with, suffer blocking or receive any negative impact to ongoing V2X communications, and any communication between the respective vehicle UEs is completed in a timely and reliable manner.

One way to resolve this resource allocation problem is to have the resource allocation in the common frequency spectrum coordinated and delivered via a single MNO for all UEs in that area or region. This MNO may also be responsible for the deployment of V2X services over the common frequency spectrum in the designated area(s) or region, and as such responsible for the allocation of the associated sidelink resources used by the respective vehicle UEs within that area or region.

In this case, if the vehicle UE selects or re-selects the V2X MNO to perform V2X communication, the vehicle UE may then not be able to continue to receive other services from its primary MNOs.

In some cases, the vehicle UE may have concurrent access to the two MNOs, for example, to receive services on different frequencies, where at least one frequency is owned or operated by each of the respective MNOs. One of the two MNOs is a V2X MNO which controls a common frequency spectrum in a geographic area, that vehicle UEs in the geographic area may access and communicate on for V2V or V2X communications. The other MNO may be the primary MNO that the vehicle UE is associated with for other services e.g. infotainment services.

To address this requirement in one implementation, a UE can operate in a Dual Connectivity mode, where the UE is simultaneously connected to two eNBs, one from each MNO, for example the MeNB may be from its primary MNO and the SeNB may be from the V2X MNO.

Furthermore, because the eNBs are from different MNOs it may be undesired for the eNB of one MNO to make decisions regarding the access control and allocation of resources of another eNB operated or owned by another MNO. In fact, as the eNB of the MNO operating the V2X services may be supporting vehicle UEs of multiple MNOs in the local area it may be desirable that, the V2X MNO's eNB, or at least the MNO owning or operating the V2X eNB retains control regarding the access, allocation and assignment for sidelink resources used on its frequency spectrum. Hence in this embodiment where the V2X eNB is the SeNB, that the SeNB can allocate and control V2X sidelink resources in the DC configuration even if the MeNB and SeNB belong to different Mobile Network Operators (MNOs).

Specifically, the SeNB can provide sidelink resource configuration information during the SeNB addition procedure e.g. via the primary MeNB. Additionally, during DC configuration, the UE can be instructed to request a sidelink resource from the target SeNB and receive sidelink resource scheduling and synchronization directly from the SeNB. Furthermore, the signaling overhead of sidelink configuration can be reduced during mobility between different SeNBs and the related MNO charging information can be reconciled between the MeNB and the SeNB. FIGS. 1-15 and associated descriptions provide additional details of these implementations.

FIG. 1 is an example wireless communication system 100 according to an implementation. The example wireless communication system 100 includes a first MNO network 140a including a service server 130a and a MeNB 120a, a second MNO network 140b including a service server 130b and a MeNB 120b, and a V2X MNO network 150 including a V2X server 132 and a SeNB 152.

A wireless communication network, e.g., the first MNO network 140a, the second MNO network 140b, or the V2X MNO network 150, may implement a radio access technology (RAT), such as long term evolution (LTE), LTE-Advanced (LTE-A), 5G RAT (NR), Global System for Mobile communication (GSM), General Packet Radio Service (GPRS), Enhanced Data rates for GSM Evolution (EDGE), Interim Standard 95 (IS-95), Code Division Multiple Access (CDMA)2000, Evolution-Data Optimized (EVDO), or Universal Mobile Telecommunications System (UMTS). In many applications, the MNO network includes a Radio Access Network (RAN) and a core network. A RAN includes at least one base station. A base station may be a radio base station that may control all or at least some radio-related functions. The base station may provide one or more radio interfaces with a wireless coverage area or cells for a mobile device to communicate. The base station or base stations may be distributed throughout the cellular network to provide a wide area of coverage. The base station directly communicates to one or a plurality of mobile devices, other base stations, and one or more core network nodes. The base station may comprise a control unit connected to the core network or other radio network nodes and one or more distributed units providing radio coverage connected to the control unit. The base station may be a NodeB, an evolved NodeB (eNB), a next generation (i.e., 5G) NodeB (gNB), or an access point (AP). The base station may operate as a serving eNB, primary eNB, MeNB, e.g., the MeNB 120a or 120b, or a Secondary SeNB, e.g., the SeNB 152.

The wireless communication network also includes one or more application servers, e.g., the service servers 130a-b, or the V2X server 132. An application server can be an application, set of applications, software, software modules, hardware, or combination thereof that are configured to provide services to UEs associated with the wireless communication network. For example, the service servers 130a-b may provide telematics, infotainment, or any other services to UEs associated with the MNO networks 140a-b respectively. The V2X server 132 can authorize and provide V2X communication services for the UEs in the geographic area covered by the V2X MNO network 150.

A wireless communication network can also include a core network. The core network includes one or more core network (CN) nodes that provide core network service to the UE associated with the wireless communication network. The core network may be an Evolved Packet Core network (EPC) or a 5G Core Network (5G-CN or NGC), can provide communication channels between the RAN and the Internet. The core network includes a mobility management entity (MME), a gateway, and a home subscriber server (HSS). The MME includes an application, set of applications, software, software modules, hardware, or combination thereof that can be configured to provide mobility management functions for the core network. In some cases, the MME can perform one or more functions including idle mode UE paging, bearer activation/deactivation process, attach process, ciphering/integrity protection for non-access-stratum (NAS) signaling, control plane function for mobility between the RATs, and the like. The MME can hold non access-stratum (NAS) context for a UE in an attached state. The NAS context includes a NAS security context for the UE.

The gateway includes an application, set of applications, software, software modules, hardware, or combination thereof that can be configured to provide user plane functions for the core network 120. In some cases, the gateway can include one or more serving getaway (SGW), Packet Data Network (PDN) gateway (P-GW), or a combination thereof. The HSS includes an application, set of applications, software, software modules, hardware, or combination thereof that can be configured to provide subscription information for the core network. The HSS can include a database that stores user-related and subscription-related information. The HSS provides functionalities such as mobility management, call and session establishment support, user authentication and access authorization. In some cases, the HSS can include one or more Home Location Register (HLR), Authentication Center (AuC) or a combination thereof.

The example wireless communication system 100 also includes UEs 102a, 104a, 102b, and 104b. These UEs may be associated with different primary networks. For example, the UEs 102a and 104a are associated with the first MNO network 140a. As such, the UEs 102a and 104a have a Uu interface connection 112a and 114a, respectively, with the MeNB 120a of the first MNO network 140a. The UEs 102a and 104a can receive infotainment or telematics services from the service server 130a of the first MNO network 140a over these Uu interface connections. Similarly, the UEs 102b and 104b are associated with the second MNO network 140b. As such, the UEs 102b and 104b have a Uu interface connection 112b and 114b, respectively, with the MeNB 120b of the second MNO network 140b. The UEs 102b and 104b can receive infotainment or telematics services from the service server 130b of the second MNO network 140b over these Uu interface connections.

As illustrated, UEs 102a, 104a, 102b, and 104b operate in the Dual Connectivity mode and therefore they also have Uu interface connection 116a, 116b, 116c, and 116d, respectively with the SeNB 152 in addition to their connections with their respective MeNBs. In addition, the MeNBs 120a-b are connected with the SeNB 152 over the X2 interface connections 124a-b, respectively. In operation, the UEs 102a, 104a, 102b, and 104b can send a request for resources for sidelink communication to the SeNB 152, directly to the SeNB 152 or via their respective primary MeNBs (the MeNBs 120a-b), and receive sidelink configuration information from the SeNB 152, either directly from the SeNB 152 or via their respective primary MeNBs. Furthermore, the SeNB 152 can provide scheduling and synchronization functions for these UEs to perform V2X sidelink communications among each other. FIGS. 2-15 provide additional details of these implementations.

Turning to a general description, a UE, e.g., the UEs 102a, 104a, 102b, or 104b, may include, without limitation, any of the following: computing device, mobile device, mobile electronic device, user device, mobile station, subscriber station, portable electronic device, mobile communications device, wireless modem, wireless terminal, vehicle device. As illustrated in FIG. 1, a UE may include a module fitted within a vehicle or a purpose built transferable module. In some cases, a UE may include a Mobile Equipment (ME) incorporating a Universal Subscriber Identity Module (USIM), a Universal Integrated Circuit Card (UICC) or embedded UICC (eUICC). Examples of a UE may include a cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data, via a wireless communication connection. The wireless communication network may include a wireless link over at least one of a licensed spectrum and an unlicensed spectrum. The term "UE" can also refer to any hardware or software component that can terminate a communication session for a user. In addition, the terms "user equipment," "UE," "user equipment device," "user agent," "UA," "user device", "ProSe-enabled UE", "remote UE", "vehicle UE" and "mobile device" can be used synonymously herein.

While elements of FIG. 1 are shown as including various component parts, portions or modules that implement the various features and functionality, nevertheless these elements may instead include a number of sub-modules, third-party services, components, libraries, and such, as appropriate. Furthermore, the features and functionality of various components can be combined into fewer components, as appropriate.

Figure 2:
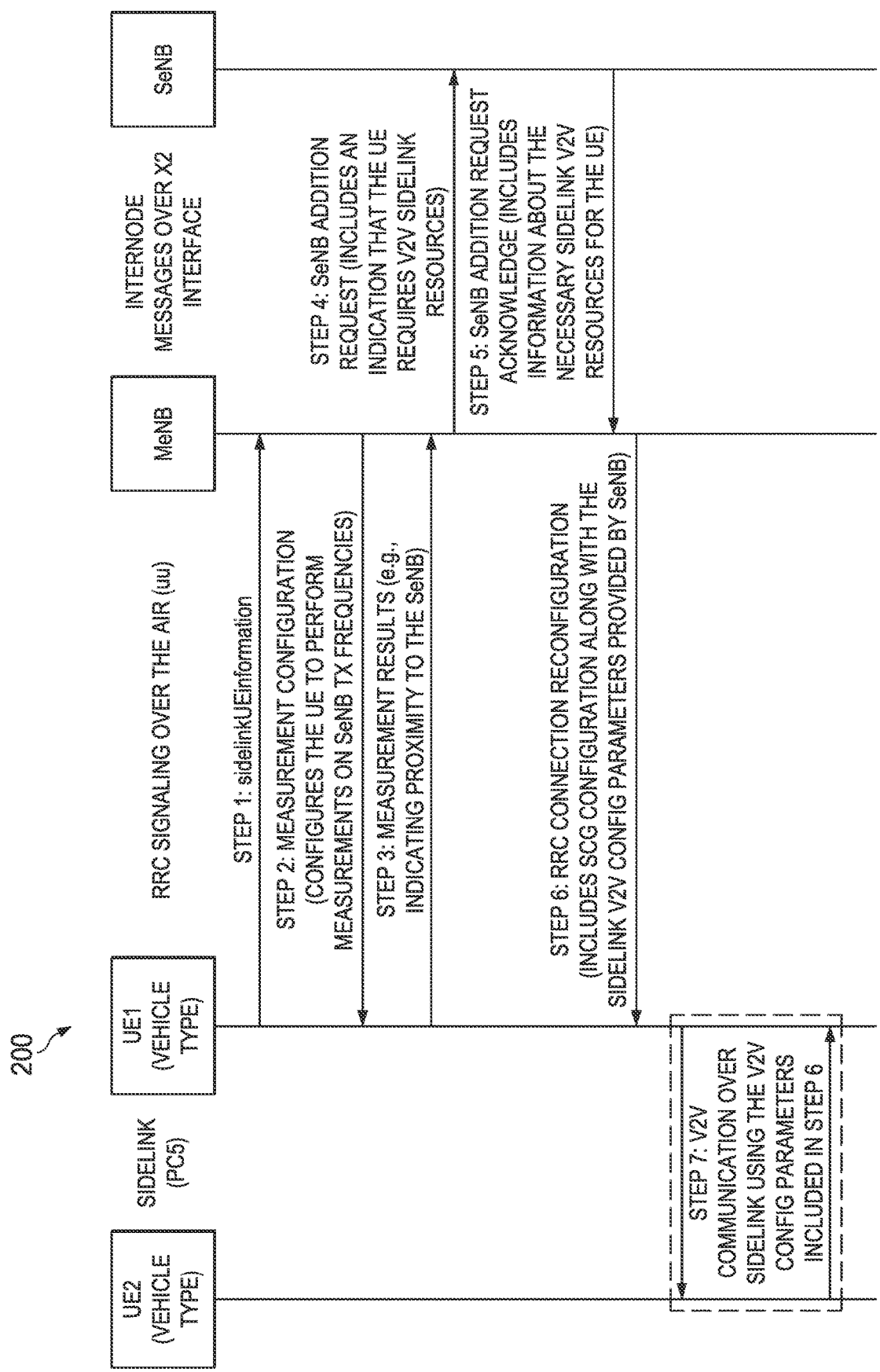
FIG. 2 is an example flow diagram illustrating a dual connectivity configuration process, according to an implementation.

FIG. 2 is an example flow diagram illustrating a dual connectivity configuration process 200 according to an implementation. The process 200 can be implemented using additional, fewer, or different steps, which can be performed in the order shown or in a different order.

At step 1, UE1 sends the sidelinkUEinformation message to the serving cell (e.g. serving eNB) of a first MNO, to indicate that UE1 is interested in establishing V2X service, e.g., by including an index of the frequency on which UE1 is interested in establishing the V2X sidelink communications. The indicated frequency can be the frequency used to receive (e.g. via the IE v2x-CommRxInterestedFreq) V2X information, transmit (e.g. via the IE v2x-CommTxFreq) V2X information, or a combination thereof. The indicated frequency index can be according to the order that the frequencies are included in the IE v2x-InterFreqInfoList included in SIB21 transmitted by the serving eNB or alternatively transmitted by the target eNB of a second MNO operating the desired V2x services (e.g. V2X target SeNB). Alternatively, the information can be preconfigured or hard coded in UE1 or UE1's UICC, eUICC or USIM. The frequency for V2X eNB can also be provided when the UE1 performs registration either with the network or with the V2X applications server, or preconfigured or assigned for use in a given geographical area e.g. via a regulatory framework. This includes the case where the frequency is a frequency not owned or managed by the current serving or registered Public Land Mobile Network (PLMN).

Having received the indication from the UE, the serving eNB, at step 2 configures UE1, which can be identified by an eNB based on UE identity (UE ID1), with one or more V2X target SeNB transmission frequencies upon which the V2X target SeNB can be detected by UE1. The serving eNB transmits the configured measurement information to UE1. The configuration measurement information includes the transmission frequencies. Thus UE1 can perform and report to the eNB of the serving MNO the related measurements on the configured V2X target SeNB transmission frequencies.

In some cases, the serving eNB can verify that UE1 supports V2X sidelink communications via Dual Connectivity configuration before configuring the measurement information. For example, a UE1 can indicate this capability to the Evolved Universal Mobile Telecommunications System (UMTS) Terrestrial Radio Access Network (E-UTRAN) via the IE UE-EUTRA-Capability. The UE1 can also indicate this capability in the sidelinkUEinformation message, wherein reception of the capability by the network leads to the eNB configuring the UE with measurements for the target frequency.

In some cases, inclusion of target frequency information may be optional if UE1 is already aware of the SeNB transmission frequency. This may be the case for instance if such information is available on system information, e.g., as received in SIB21 of the serving eNB, or the information may be preconfigured in UE1's UICC, eUICC or USIM, or the frequency may be provided by the serving network when UE1 performs registration, or preconfigured or assigned for use in a given geographical area, e.g., via regulatory framework.

At step 3, UE1 transmits measurement results to the serving eNB. The measurement results may indicate the relative proximity of UE1 to the target SeNB, or enable the serving eNB to determine the relative proximity of UE1 to the target SeNB, for example by indicating that the measured relative received signal strength of the target SeNB frequency is at or above a suitable level with which a radio link may be established and or maintained with the target SeNB.

At step 4, the serving eNB transmits to the target SeNB identified in the received measurement results an addition request message to the SeNB. Where the target SeNB is operating the V2X service and managing sidelink radio resources. The target SeNB may be operated by a different MNO to the MNO which is operating the serving eNB. The SeNB addition request message can include an indication information element (IE) indicating that UE1 requests service authorization, access permission and sidelink resources for V2X services. This indication may be the sidelinkUEinformation message sent by UE1 to express interest in V2X services and that the serving eNB has received from UE1 in step 1. The target SeNB addition request message can also include a UE identity indicating the requesting UE, e.g., UE1 ID1.

In some cases, the serving eNB chooses the target SeNB to send the SeNB addition request message. The serving eNB can make this choice based on one or more of the following factors:

Pre-configuration in the serving eNB determining which target SeNB can provide sidelink information;

the target SeNB with the strongest measurement result;

service agreements between UE1 and the operator operating the serving eNB, explicit indication from the UE1, other implementation specific factors.

At step 5, the target SeNB performs any authorization function required, admission control, with the help of another V2X service entity in the network as required e.g. V2X application server, HSS and transmits an SeNB addition request acknowledgement message to the MeNB. The SeNB addition request acknowledgement message includes sidelink configuration information for UE1. The SeNB addition request acknowledgement message can also include an alternative and additional identity of the UE which the UE is identified within the target SeNB of the second MNO, e.g., UE1 ID2. The Sidelink configuration information can include: sidelink communication configuration or sidelink discovery frequency, resource configurations, or a combination thereof. The sidelink configuration information can be encapsulated in a new dedicated RRC message or container, or an existing RRC message or container, e.g., within the SCG-Config.

The serving eNB on receiving the UE configuration from the target SeNB including the sidelink configuration and UE ID2, creates and stores a mapping from UE ID1 to the target SeNB including the UE ID2 if included, which is to be used in future handling of messages from the UE as and when intended for the target SeNB. Each UE identity can be one of: Globally Unique Temporary Identifier (GUTI), Temporary Mobile Subscriber Identity (TMSI), International Mobile Subscriber Identity (IMSI), Cell Radio Network Temporary Identifier (CRNTI), ProSe UE ID, ProSe Layer-2 Group ID, V2X UE ID or V2X Layer-2 Group ID, SeNB X2AP ID, MeNB X2AP ID, or the like.

At step 6, the serving eNB transmits a radio resource control (RRC) connection reconfiguration message to UE1. The RRC connection reconfiguration message includes the sidelink configuration information that the serving eNB receives at step 5. In some cases, the serving eNB forwards the sidelink configuration information received at step 5 without modifications. In some cases, the serving eNB can check the received sidelink configuration information against configured information stored in the serving eNB. The serving eNB can transmit the received sidelink configuration without any modification, this approach is referred to as transparent tunnelling. Alternatively, the serving eNB can check the received sidelink configuration information and modify the sidelink configuration information before transmitting it to the UE. This approach is referred to as non-transparent tunnelling. The serving eNB may store the received sidelink configuration within the serving eNB using the UE identity e.g. UE ID1 as a reference for future recall or reference, and may include additional information for example target SeNB identity or Cell identity, e.g. CellID. In response to receiving the RRCConnectionReconfiguration message with the dual connectivity configuration and the sidelink configuration, if the UE accepts the reconfiguration message, that is the parameters included are considered valid, the UE then goes ahead and reconfigures its RRC configuration to include the sidelink configuration included in the RRCConnectionReconfiguration message.

On successfully completing the RRC reconfiguration the UE sends a RRCConnectionReconfigurationComplete message to the serving eNB and in the UE RRC activates the dual connectivity configuration if not already configured, and establishes the sidelink configuration in accordance with the received sidelink configuration for the SeNB. On receiving the RRCConnectionReconfigurationComplete message the serving eNB confirms the configuration of the dual connectivity configuration with the SeNB. The serving eNB is now known as the MeNB, wherein the MeNB and SeNB establish the corresponding data radio bearer for the delivery of V2X services via the dual connectivity configuration.

At step 7, following determination that they need to exchange data via the sidelink, UE1 and UE2 establish a sidelink V2X communication. UE1 and UE2 transmit and receive information over the sidelink resources configured to UE1 in the sidelink configuration information conveyed in step 6.

In some cases, for example when the sidelink configuration needs to change due to the UE changing geographical coverage, the MeNB can also receive updated sidelink configuration information from the SeNB and therefore the MeNB transmits the updated sidelink configuration information to the UE, either transparently or non-transparently. The MeNB can also store the updated sidelink configuration information in the MeNB in association with the identity of UE1 ID1, UE1 ID2, or a combination thereof. The MeNB can also store the associated SeNB identity or CellID.

In some cases, if there is change to the sidelink configuration for a UE, such as required for an Intra-SeNB SCG Change or Intra-PSCell SCG Change, the MeNB or SeNB can generate (re)configuration message to setup, modify or release the UE context information. This message may be included by the MeNB or SeNB within the MeNB to SeNB container or SeNB to MeNB container respectively and forwarded to the corresponding node.

The following descriptions provide additional details of the process 200.

In order to add sidelink resources for UE1, the following procedures are performed:

The MeNB determines that UE1 is in proximity of the target SeNB responsible for providing Sidelink V2X resources;

The serving eNB requests the setup of the dual connectivity configuration for UE1 from the target SeNB for support of V2X services;

The target SeNB performs admission control and, if successful, provides the UE sidelink resource configuration towards the MeNB;

The MeNB configures UE1 with a dual connectivity (SCG) configuration which includes the target SeNB based sidelink resources (i.e., sidelink resources which are provided by, and are under the control of, the SeNB), The UE first indicates that it is interested in sidelink based V2V/V2X communications, for example by transmitting a sidelinkUEinformation message to the MeNB (see 3GPP TS 36.300). Upon receiving this indication, the MeNB configures the UE with measurement configuration, indicating the transmission frequencies upon which the SeNB can be detected by the UE. The measurement configuration for SeNB measurements can be the same as the ones used for current dual connectivity operation. If the UE is in proximity of an SeNB or associated cell of the SeNB, which is included in the measurement configuration, (for example if the measurement of the required transmission frequency or carrier is above a certain threshold to meet a specific trigger to generate a measurement result) then a measurement report is triggered and sent to the serving cell of the UE as controlled by the MeNB.

The MeNB then contacts the SeNB to request the dual connectivity setup for the UE to enable UE1 to establish V2X services using the resources controlled by the SeNB. The SeNB performs admission control to determine if UE1 is permitted to have access to the V2X resources and whether sufficient resources are available, and, if successful, the SeNB provides the configuration for UE1 allocated resources to the MeNB. The MeNB then configures UE1 with dual connectivity configuration and provides to UE1 the sidelink resources configured by the SeNB.

In some cases, the sidelink configuration information can be included SCG-Config message, which is included in the SeNB to MeNB container IE in the SeNB addition request acknowledge message sent from the SeNB to the MeNB via the X2 interface. The sidelink configuration can be included as a new IE.

FIG. 3 illustrates an example SCG-Config message according to an implementation. As illustrated, the example SCG-Config message includes an IE scg-RadioConfig-r12. In some cases, the IE scg-RadioConfig-r12 can further include an information element (IE) for example slConfigSCG-r15 that includes sidelink configuration information which provides details of the required configuration for sidelink communication and or sidelink discovery resources for the sidelink operation as configured for the UE using resources controlled by the SeNB. In some cases, the IE slConfigSCG-r15 can include detailed sidelink configuration information in the form of detailed sidelink IEs. FIG. 4 illustrates an example IE slConfigSCG-r15, according to an implementation. As illustrated, the example IE slConfigSCG-r15 can include sidelink configuration IEs such as captured in 3GPP TS36.331 SL-CommConfig, SL-CommResourcePool, SL-CP-Len, SL-DiscConfig, SL-Di scResourcePool, SL-DiscTxPowerInfo, SL-GapConfig, SL-GapRequest, SL-HoppingConfig, SL-SyncConfig, SL-SSD, V2X-SyncConfig, SL-V2X-ConfigDedicated, or the like.

In some cases, a reduced number of information elements may be included in the IE scg-RadioConfig-r12 or alternatively directly in the SCG-Config message directly. FIG. 5 illustrates another example of the IE slConfigSCG-r15, according to an implementation. As illustrated, another example IE slConfigSCG-r15 can include a subset of the information as shown in FIG. 4.

FIG. 6 (including FIGS. 6A and 6B) illustrates an example IE SL-V2X-ConfigDedicated, according to an implementation. As shown in FIG. 6, the IE v2x-InterFreqInfoList-r14, which indicates synchronization and resource allocation configurations of other carrier frequencies than the serving carrier frequency for V2X sidelink communication, is included in the IE SL-V2X-ConfigDedicated which includes the sidelink configuration for V2X sidelink communication.

Referring to the 3GPP TS 36.331 where the SCG-Config message is defined, the following changes are necessary to enable the addition of sidelink configuration in the SCG-Config message.

In summary, the SCG-Config information element (IE) is modified to accommodate the new sidelink configuration IE to be included in the message. The sidelink configuration IE is shown above as slConfigSCG-r15 IE. This IE includes the information of the sidelink communication and discovery resources. Specifically, it includes the configuration IEs that are used to configure UE1 with SeNB based sidelink resources.

Upon receiving the SCG-Config IE in the container from the SeNB, the serving eNB or MeNB transfers the message either unaltered (i.e., transparent tunnelling) or by changing certain fields (i.e., non transparent tunnelling) and sends this message to the UE.

FIG. 7 illustrates an example UE-EUTRA-Capability information element UE-EUTRA-Capability-v14xy-IEs, according to an implementation. As illustrated, UE-EUTRA-Capability-v14xy-IEs includes an IE sl-parameters-v14xy, which indicates whether the UE supports V2X sidelink communications via SeNB, using Dual Connectivity configuration. In some cases, an IE v2x-dcConfig-r14 can be set to indicate whether the UE supports V2X sidelink communications via SeNB using Dual Connectivity configuration, for example by setting to a value 1 or 0 alternatively TRUE or FALSE. Alternatively, the UE can include the IE v2x-dcConfig-r14 to indicate that the UE supports V2X sidelink communications via SeNB using Dual Connectivity configuration and omit the IE v2x-dcConfig-r14 to indicate that the UE does not support V2X sidelink communications via SeNB using Dual Connectivity configuration.

Returning to FIG. 2, in some cases, in a dual connectivity based architecture, if the sidelink resource scheduler is located in the SeNB, then the UE, e.g., UE1, can selectively direct the dynamic sidelink resource requests, e.g., the sidelink buffer status report (BSR), to the SeNB instead of to the MeNB. In doing this additional delays associated with the MeNB processing of the resource request may be avoided.

Scheduled mode of operation on the sidelink has the advantage of providing collision free transmission opportunities on the sidelink. Thus enabling SeNB based scheduled sidelink communications can improve the reliability of sidelink transmissions. In order to configure the UE to send sidelink resource requests (e.g., sidelink BSR messages) to a specific eNB (in this example, the SeNB), the serving eNB or MeNB may, either explicitly or implicitly, provide a corresponding indication of the intended destination eNB for the sidelink resource requests e.g. BSR messages, to the UE.

Moreover, the sidelink transmissions are synchronized to a specific synchronization source. The UE may be provided with an indication (again, either explicit or implicit) of the sidelink synchronization source. The sidelink synchronization source may be provided by an eNB (e.g., MeNB or SeNB), a reference UE (e.g., sync-ref-UE) or another sync source (e.g., satellite based synchronization via GPS)

In dual connectivity architecture where SeNB is responsible for the sidelink resources, the SeNB may also provide sidelink synchronization. In this case, the UE can selectively obtain the sidelink synchronization from SeNB instead of the MeNB, or another sync source. The MeNB may, either explicitly or implicitly, provide an indication of the eNB used for synchronization to the UE.

In order to configure the UE to direct the sidelink resource requests to the SeNB or another eNB other than the MeNB, the RRC configuration of V2X sidelink resources provided to the UE can include an indication providing the UE about the identity of the node responsible for sidelink scheduling. This indication may be included directly by the SeNB when providing the V2X sidelink resources during SeNB addition procedure, e.g., step 5, and sent to UE via MeNB. Alternatively, this may be added by the MeNB following the SeNB addition procedure in the RRC reconfiguration message sent directly to the UE, e.g., step 6.

The indication in any of these messages can be explicit (e.g., an RRC IE indicating the node responsible for scheduling). For example, the SeNB may include an indication of node identity, e.g., an PLMN id and an SeNB Id, about the node responsible for sidelink scheduling in the SeNB addition request acknowledgement message in step 5, as an explicit indication of the node responsible for sidelink scheduling.

The indication can also be implicit. For example, a set of rules can be configured at the MeNB regarding the node responsible for sidelink scheduling. In one example, if the sidelink configuration is received during SeNB addition or if UE is in dual connection and subsequently has sidelink resources assigned from the SeNB, then the SeNB can be understood to be the node responsible for sidelink scheduling.

At step 6, the MeNB can indicate to UE1 the node responsible for sidelink scheduling. Similar to step 5, this indication can be explicit, e.g., including the node identity of the SeNB in the RRC connection reconfiguration message. This indication can also be implicit, e.g., the UE can be preconfigured to use one of the eNBs (e.g., SeNB managing or assigning the sidelink resources) as the sidelink scheduling source, if the node identity is not included in the RRC connection reconfiguration message for example when the reconfiguration adds the sidelink configuration during a dual cell connectivity configuration. Once the UE determines the sidelink scheduling source, the UE selectively directs the sidelink scheduling requests (e.g., sidelink BSR) to the determined node.

FIG. 8 illustrates an example IE for explicit indication according to an implementation. As shown in FIG. 8, the RRC signalling messages (e.g., SCG-Config) may be enhanced to include an additional indication IE slSchedulingNode, indicating which eNB is responsible for sidelink resource scheduling, and an additional IE slSyncSource, to indicate which eNB is used for synchronization. Such indications may be received for example on the X2 interface from the SeNB in the SeNB to MeNB container sent over the SeNB addition request acknowledge message. Such indications may also be included in a new IE introduced in the message configuring the SCG-Config sent from MeNB to UE.

In some cases, the scheduling source eNB and the synchronization source eNB may be the same, or different.

As discussed previously, the indication of the sidelink scheduling or the sidelink synchronization eNB can also be implicit. In this case, the UE can be preconfigured to determine the node responsible for sidelink scheduling or sidelink synchronization.

In one example, if the UE has sidelink resources configured along with an ongoing (i.e., active) DC configuration, then the UE may be preconfigured to determine that one of the eNBs (e.g., the MeNB or the SeNB) is responsible for sidelink scheduling, synchronization, or a combination thereof. For instance, the node responsible for sidelink scheduling or synchronization may be specified in the standards as being associated to one of the MeNB or SeNB involved in the DC configuration or alternatively some separately identified source node, and thus the UE determines the responsible node accordingly once the UE enters the DC configuration.

In another example, if the SeNB based sidelink configuration is provided to the UE (e.g., if the sidelink configuration is included in the SCG-Config message—i.e., the message configuring the SCG part of the DC configuration), the UE may implicitly assume that sidelink scheduling and sidelink synchronization are also provided by the SeNB. Otherwise, the UE assumes that the MeNB is responsible for both sidelink scheduling and synchronization.

Figure 9:
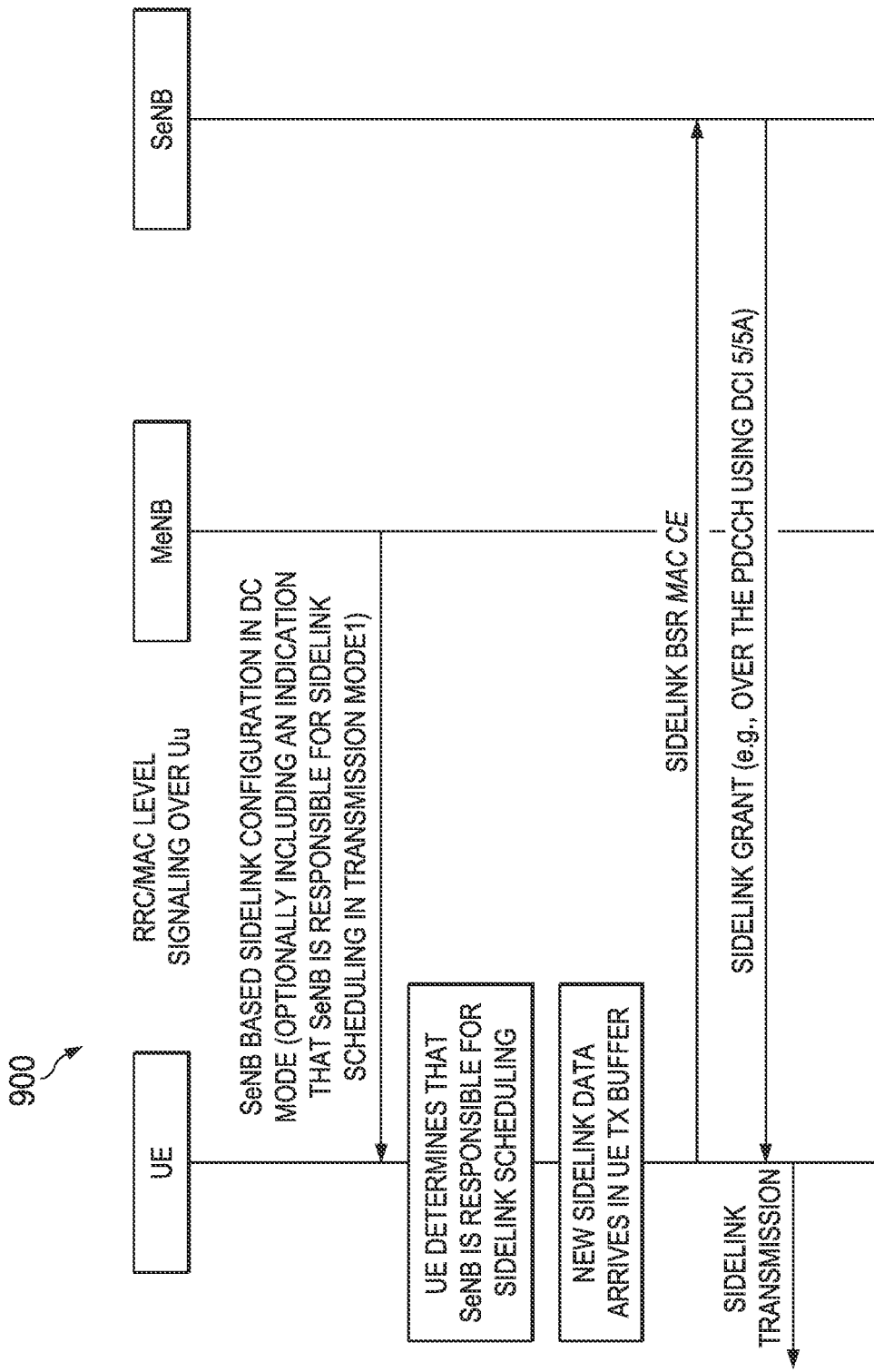
FIG. 9 illustrates an example flow diagram illustrating a sidelink scheduling process, according to an implementation.

Upon determining which node is responsible for sidelink scheduling, the UE can transmit sidelink BSRs to the determined responsible eNB. FIG. 9 illustrates an example flow diagram illustrating a sidelink scheduling process 900, according to an implementation. The process 900 can be implemented using additional, fewer, or different steps, which can be performed in the order shown or in a different order.

As illustrated, the MeNB transmits a sidelink configuration information to the UE. The sidelink configuration information may include an indication that the SeNB is responsible for sidelink scheduling (explicit indication). The UE determines that the SeNB is responsible for sidelink scheduling, either through reception of the explicit indication or by implicit indication. After new data arrives in the UE's sidelink transmit buffer, the UE generates a sidelink BSR to indicate that data is in the UE buffer for transmission and transmits this status report over the radio link, for example the uplink, to the SeNB. Upon receiving this sidelink BSR, the SeNB transmits a sidelink grant to the UE indicating the sidelink resources to use for transmitting the sidelink data. The UE transmits the sidelink data using the determined sidelink resources.

As the UE moves between SeNBs, the MeNB is responsible for adding new SeNBs to the UE. This can be achieved via the use of the SeNB modification procedures, where the MeNB can instruct the UE to perform RRC Connection Reconfiguration using the updated CSG-Config for the new SeNB configuration.

If the SeNB provides coverage over a small area, then it is likely to increase the signalling overhead for the UE to update the SCG configuration for the UE with high mobility (e.g., a vehicle). In order to minimize the amount of RRC signaling and reduce delays introduced during SeNB change, the V2X sidelink configuration provided during the initial SeNB addition may be retained by the UE. This configuration may be retained indefinitely, e.g., until explicitly deleted or released via RRC signalling. This configuration may also be retained on a limited basis, e.g., utilized within a geographical area or a time period. As such, the UE can keep a persistent V2X sidelink configuration which is used by the UE beyond current SeNB for scheduled sidelink operation with a different SeNB.

In these cases, when the UE moves from one SeNB to another SeNB, the new RRC connection reconfiguration message providing the SCG configuration may exclude the sidelink configuration. The exclusion of the sidelink information from the reconfiguration message may be combined with knowledge regarding the geographical area the UE is currently located in, or the duration that the existing sidelink configuration has been configured for in order to retain and continue to use the existing sidelink configuration. Instead, the new RRC connection reconfiguration message can include an indication that the existing sidelink configuration may be used, without resending the detailed information or configuration. This approach may significantly reduce the size of the RRC connection reconfiguration message and hence, provides a quick transmission with reduced service interruption to the UE. Alternately by only including parameters that need to be changed in the new SeNB or following the change caused by the UE mobility, the RRC reconfiguration message can enable the sidelink configuration to be changed by sending only any necessary parameters to enable the continued use of the prior configuration with the addition of the amended parameters.

For example, among the configuration elements in the SlConfigSCG-r15 illustrated in FIG. 4, the SSID may be reallocated by the new SeNB, while some or other configuration elements can be retained at the UE. This can be achieved by defining the new fields in the SeNB based sidelink configuration as "Need ON" per the RRC conventions. The "Need ON" can indicate a field that is optional to signal. If the message is received by the UE, and in case the field is absent, the UE takes no action and, where applicable, continues to use the existing value and the associated functionality.

Thus, the MeNB triggers moving from one SeNB to another SeNB, via the SeNB change procedure. The MeNB sends a SeNB addition request message to the new (or target SeNB) including the SCG configuration from the old (current) SeNB in the SeNB addition request message.

The target SeNB examines the SeNB addition request message and specifically the UE's sidelink configuration included within the SCG-ConfigInfo message. The target SeNB may decide that there is no need to update or duplicate the sidelink configuration. Alternately the target SeNB may be aware or may be made aware by the MeNB that the UE is within the same geographic area or in a same configured area for maintaining the validity of the sidelink configuration compared to that signaled by the original or preceding SeNB sending the sidelink configuration in use by the UE. The target SeNB awareness may be preconfigured or alternatively may be signaled as a location indication identifier in the SeNB addition request message. The target SeNB may either implicitly or explicitly indicate that the existing sidelink configuration for the UE may be reused. As an example if the SeNB decides to modify any or some of the sidelink configuration, then it may include the new configuration IEs in the new SCG-Config message. If, on the other hand, it decides that a given sidelink configuration need not be updated (and hence continued to be used at the UE), it may simply exclude it from the SCG-Config message. The resulting SCG-Config message may be sent to the MeNB in the SeNB Addition Request Acknowledgement message.

The MeNB, on receiving the SeNB addition request acknowledgement message as an indication of the successful addition of the new SeNB, releases the old SeNB and sends an RRC reconfiguration to the UE. The UE synchronizes and connects to the target SeNB with the appropriate configuration as received in the RRC reconfiguration message from the MeNB. The UE receives any new RRC sidelink configuration message, e.g., SlConfigSCG-r15 from the MeNB, which may include only the IEs that need to be updated for use in the new SeNB. As a further option, the MeNB may completely omit the RRC message, e.g., SlConfigSCG-r15, when configuring the new SeNB, or optionally an indication to reuse or continue to use the existing configuration in the new SeNB. In this case, the UE reuses all of the parameters previously signaled.

Figure 10:
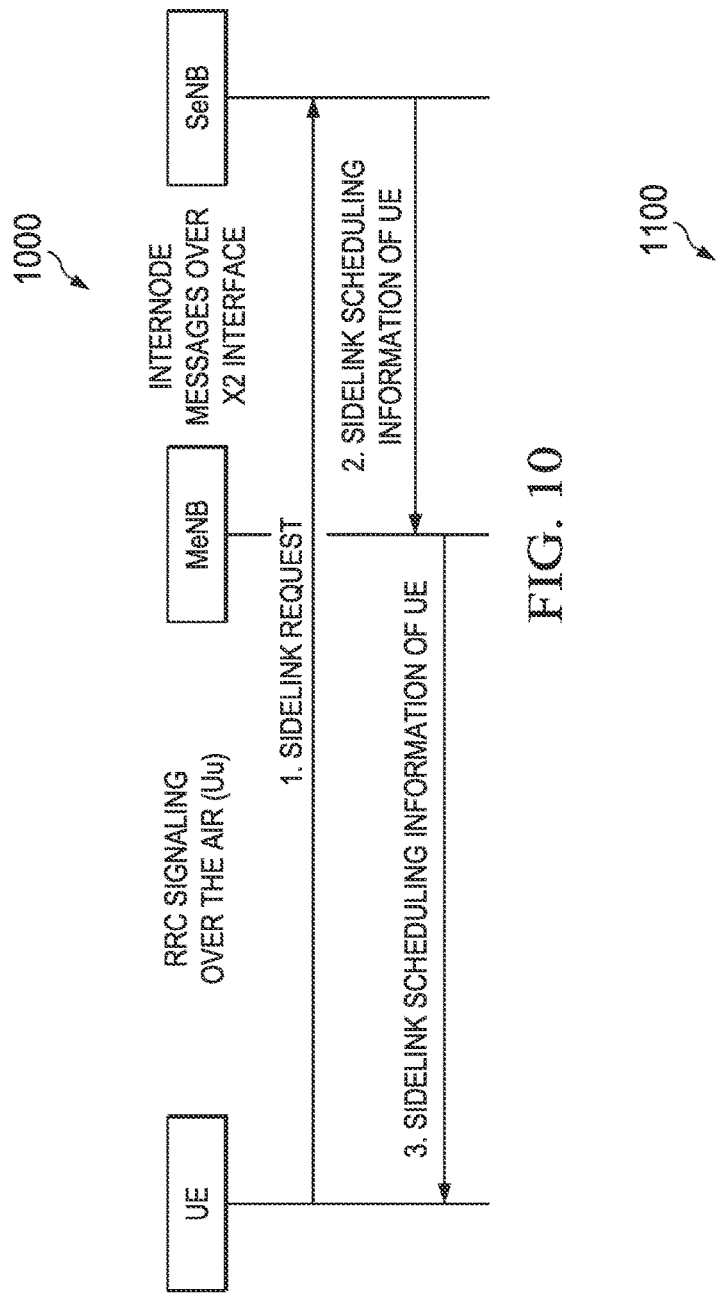
FIG. 10 illustrates an example flow diagram illustrating a sidelink charging reconciliation process, according to an implementation.

FIG. 10 illustrates an example flow diagram illustrating a sidelink charging reconciliation process 1000, according to an implementation. The process 1000 can be implemented using additional, fewer, or different steps, which can be performed in the order shown or in a different order.

In some cases, the MeNB can be informed of the resources that have been scheduled by the SeNB. At step 1, a UE makes a request for sidelink resource, e.g., by sending a sidelink BSR to the SeNB, this may be received directly from the UE or tunneled or forwarded via the MeNB to the SeNB. Upon receiving the request, the SeNB schedules the resources and, at step 2, sends the sidelink scheduling message for the UE, to the MeNB. MeNB receives the message. At step 3, the MeNB sends the sidelink scheduling information, received in step 2, to the UE. The UE receives the sidelink scheduling information. The MeNB is thus aware of the sidelink resource grants provided by the SeNB to the UE and hence, can make a corresponding indication to the core network (CN) nodes responsible for charging.

Figure 11:
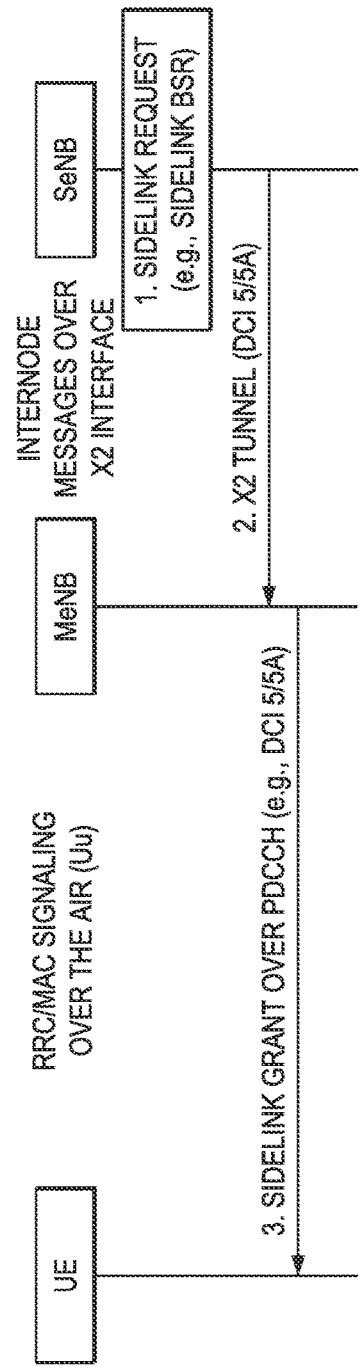
FIG. 11 illustrates an example flow diagram illustrating another sidelink charging reconciliation process, according to an implementation.

FIG. 11 illustrates an example flow diagram illustrating another sidelink charging reconciliation process 1100, according to an implementation. The process 1100 can be implemented using additional, fewer, or different steps, which can be performed in the order shown or in a different order.

At step 1, the SeNB receives a sidelink BSR message, either from the UE or via the X2 interface in a Tunnel Uplink Message from the MeNB. The SeNB determines that the UE requesting the V2X sidelink communication on the V2X frequency is connected to a MeNB. The determination can be made based on the sidelink configuration information sent previously, over the X2 interface or by recording the MeNB that tunnelled the Uplink Message including the sidelink BSR message. At step 2, the SeNB sends a sidelink grant (e.g., downlink control information (DCI) format 5A message) e.g. via X2 interface. The sidelink grant can optionally include the identity of the UE. The DCI format 5A message is sent in an X2 Tunnel Downlink Message. The MeNB receives the information that has just been sent in step 2. At step 3, the MeNB forwards the DCI format 5A message to the UE and the UE receives the DCI format 5A message. FIG. 12 illustrates an example X2 Tunnel Downlink Information message, according to an implementation.

Alternatively, the SeNB on receiving the UE sidelink BSR request for sidelink resources may respond to the UE with a sidelink grant (e.g., downlink control information (DCI) format 5A message). The UE can keep track of the scheduling information received and allocated sidelink resources used and inform the MeNB or VPLMN ProSe/V2X function about the accumulated information regarding V2X sidelink resource allocation or spectrum usage. In this case, the UE either periodically, or upon termination of the V2X sidelink session, or upon an explicit request from the MeNB, sends a message (e.g. a Non-Access Stratum (NAS) message) to the MeNB or via the MeNB for the VPLMN ProSe/V2X function, indicating the resource allocation or spectrum usage on the sidelink.

The SeNB may keep track of the scheduled resources sent to the UE. The MeNB may also obtain a similar or corresponding indication of sidelink usage from the SeNB either periodically, explicitly or on termination of the associated V2X sidelink session. Alternatively, this information may be directly shared between the service providers by sharing the charging database entries as determined from the scheduling V2X SeNB (instead of the information being routed via SeNB to the MeNB). The information received from the UE is then reconciled with the information received from the service provider of the V2X services to deduce a final charge for the spectrum usage. If there is a discrepancy between the two, the charging may be based on some agreed rules for reconciliation (e.g., charge for the resources indicated by the UE or charge for the resources indicated by the SeNB, or a combination of both—e.g., the mean of the two).

FIG. 13 is an example block diagram illustrating a sidelink communication configuration method 1300 for a dual connectivity operation, according to an implementation. The process 1300 can be implemented using additional, fewer, or different steps, which can be performed in the order shown or in a different order.

At block 1302, a UE transmits a first message to a MeNB. The first message indicates a request to establish a sidelink communication. In some cases, the sidelink communication is a vehicle to another device (V2X) sidelink communication. In some cases, the UE operates in a dual connectivity (DC) mode with both the MeNB and the SeNB. In some cases, the UE transmits a capability indicator to the MeNB. The capability indicator indicates that the UE supports vehicle to V2X sidelink communications via Dual Connectivity configuration before the MeNB configures the measurement information.

At block 1304, the UE receives a second message from the MeNB. The second message indicates a sidelink frequency that is managed by a secondary evolved Node B (SeNB). At block 1306, the UE transmits a measurement result to the MeNB. The measurement result indicates relative proximity to the SeNB, in an alternative the measurement result enables the MeNB to determine or calculate the UE proximity to the SeNB for example by the received measurement report from the UE indicating the received signal strength of the SeNB transmission carrier frequency. At block 1308, the UE receives sidelink configuration information from the MeNB. The sidelink configuration information indicates sidelink resources managed by the SeNB. In some cases, the sidelink configuration information indicates whether the MeNB or the SeNB provides scheduling for the sidelink communication. In some cases, the sidelink configuration information indicates whether the MeNB or the SeNB provides synchronization for the sidelink communication. At block 1310, the UE performs the sidelink communication using the sidelink resources.

FIG. 14 is a block diagram illustrating an example user equipment (UE) device 1400. The illustrated device 1400 includes a processing unit 1402, a computer-readable storage medium 1404 (for example, ROM or flash memory), a wireless communication subsystem 1406, a user interface 1408, and an I/O interface 1410.

The processing unit 1402 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 1402 may be configured to generate control information, such as a measurement report, or respond to received information, such as control information from a network node. The processing unit 1402 may also be configured to make a Radio Resource Management (RRM) decision such as cell selection/reselection information or trigger a measurement report. The processing unit 1402 can also include other auxiliary components, such as random access memory (RAM) and read-only memory (ROM). The computer-readable storage medium 1404 can store an operating system (OS) of the device 1400 and various other computer-executable instructions, logic, or software programs for performing one or more of the processes, steps, or actions described above.

The wireless communication subsystem 1406 may be configured to provide wireless communication for voice, data and/or control information provided by the processing unit 1402. The wireless communication subsystem 1406 can include, for example, one or more antennas, a receiver, a transmitter, a local oscillator, a mixer, and a digital signal processing (DSP) unit. In some implementations, the subsystem 1406 can support multiple input multiple output (MIMO) transmissions. In some implementations, the receiver in the wireless communication subsystem 1406 can be an advance receiver or a baseline receiver. Two receivers can be implemented with identical, similar, or different receiver processing algorithms.

The user interface 1408 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 1410 can include, for example, a universal serial bus (USB) interface. Various other components can also be included in the device 1400. A number of embodiments of the invention have been described. Nevertheless, it will be understood that various modifications may be made. Accordingly, other embodiments are within the scope of the following claims.

FIG. 15 is a block diagram illustrating an example base station 1500. The example base station 1500 can be an MeNB or an SeNB. The illustrated base station 1500 includes a processing unit 1502, a wired communication subsystem 1504, and a wireless communication subsystem 1506. The wireless communication subsystem 1506 can receive data traffic and control traffic from the UE. In some implementations, the wireless communication subsystem 1506 may include a receiver and a transmitter. The wired communication subsystem 1504 can be configured to transmit and receive control information between other access node devices via backhaul connections. The processing unit 1502 can include one or more processing components (alternatively referred to as "processors" or "central processing units" (CPUs)) capable of executing instructions related to one or more of the processes, steps, or actions described above, in connection with one or more of the implementations disclosed herein. The processing unit 1502 can also include other components, such as computer-readable storage medium, e.g., random access memory (RAM), read-only memory (ROM), secondary storage (for example, a hard disk drive or flash memory). In some implementations, the processing unit 1502 may be configured to generate control information or respond to received information such as a measurement report transmitted from a UE. The processing unit 1502 may also be configured to make an RRM decision based, at least in part, on the information transmitted from the UE, such as cell selection/reselection information or the measurement report. The processing unit 1502 can execute certain instructions and commands to provide wireless or wired communication, using the wired communication subsystem 1504 or a wireless communication subsystem 1506. Various other components can also be included in the base station 1500.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively, or in addition, the program instructions can be encoded on an artificially generated propagated signal, for example, a machine-generated electrical, optical, or electromagnetic signal that is generated to encode information for transmission to suitable receiver apparatus, for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure encompasses the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure includes many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
   transmitting, from a user equipment (UE), a first message to a first Base Station (BS), wherein the first message indicates a request to establish a sidelink communication;

receiving, at the UE, a second message from the first BS, wherein the second message indicates a frequency that is used by a second BS;

transmitting, from the UE, a measurement result to the first BS; and receiving, at the UE, sidelink configuration information from the first BS, wherein the sidelink configuration information indicates sidelink resources managed by the second BS, and the sidelink configuration information indicates that the first BS provides scheduling for the sidelink communication.

2. The method of claim 1, wherein the sidelink communication is a V2X sidelink communication.

3. The method of claim 2, wherein the UE operates in a dual connectivity (DC) mode with both the first BS and the second BS.

4. The method of claim 1, further comprising: transmitting, in the first message from the UE, a capability indicator to the first BS, wherein the capability indicator indicates that the UE supports V2X sidelink communications via Dual Connectivity configuration.

5. The method of claim 1, further comprising: performing the sidelink communication using the sidelink resources.

6. The method of claim 1, wherein the sidelink configuration information indicates whether the first BS or the second BS provides synchronization for the sidelink communication.

7. A user equipment (UE), comprising:
at least one hardware processor; and
a non-transitory computer-readable storage medium coupled to the at least one hardware processor and storing programming instructions for execution by the at least one hardware processor, wherein the programming instructions, when executed, cause the at least one hardware processor to perform operations comprising:
transmitting, from the UE, a first message to a first Base Station (BS), wherein the first message indicates a request to establish a sidelink communication;
receiving, at the UE, a second message from the first BS, wherein the second message indicates a frequency that is used by a second BS;
transmitting, from the UE, a measurement result to the first BS; and
receiving, at the UE, sidelink configuration information from the first BS, wherein the sidelink configuration information indicates sidelink resources managed by the second BS, and the sidelink configuration information indicates that the first BS provides scheduling for the sidelink communication.

8. The UE of claim 7, wherein the sidelink communication is a V2X sidelink communication.

9. The UE of claim 8, wherein the UE operates in a dual connectivity (DC) mode with both the first BS and the second BS.

10. The UE of claim 7, the operations further comprising: transmitting, in the first message from the UE, a capability indicator to the first BS, wherein the capability indicator indicates that the UE supports V2X sidelink communications via Dual Connectivity configuration.

11. The UE of claim 7, the operations further comprising: performing the sidelink communication using the sidelink resources.

12. The UE of claim 7, wherein the sidelink configuration information indicates whether the first BS or the second BS provides synchronization for the sidelink communication.

13. A non-transitory computer-readable medium storing instructions which, when executed, cause a computing device to perform operations comprising:
transmitting, from a user equipment (UE), a first message to a first Base Station (BS), wherein the first message indicates a request to establish a sidelink communication;
receiving, at the UE, a second message from the first BS, wherein the second message indicates a frequency that is used by a second BS;
transmitting, from the UE, a measurement result to the first BS; and
receiving, at the UE, sidelink configuration information from the first BS, wherein the sidelink configuration information indicates sidelink resources managed by the second BS, and the sidelink configuration information indicates that the first BS provides scheduling for the sidelink communication.

14. The non-transitory computer-readable medium of claim 13, wherein the sidelink communication is a V2X sidelink communication.

15. The non-transitory computer-readable medium of claim 14, wherein the UE operates in a dual connectivity (DC) mode with both the first BS and the second BS.

16. The non-transitory computer-readable medium of claim 13, the operations further comprising: transmitting, in the first message from the UE, a capability indicator to the first BS, wherein the capability indicator indicates that the UE supports V2X sidelink communications via Dual Connectivity configuration.

17. The non-transitory computer-readable medium of claim 13, the operations further comprising: performing the sidelink communication using the sidelink resources.

18. The non-transitory computer-readable medium of claim 13, wherein the sidelink configuration information indicates whether the first BS or the second BS provides synchronization for the sidelink communication.

* * * * *